Oct. 17, 1939.    S. A. SNELL    2,176,693

VELOCIPEDE HANDLE BAR STRUCTURE

Original Filed Sept. 20, 1937

INVENTOR
SAMUEL A. SNELL
BY
ATTORNEYS

Patented Oct. 17, 1939

2,176,693

UNITED STATES PATENT OFFICE 2,176,693

VELOCIPEDE HANDLE BAR STRUCTURE

Samuel A. Snell, Toledo, Ohio, assignor to The American-National Company, Toledo, Ohio, a corporation of Ohio Original application September 20, 1937, Serial No. 164,805. Divided and this application June 20, 1938, Serial No. 214,762

9 Claims. (Cl. 74—551.1)

This invention relates generally to handle bar constructions for juvenile vehicles such as velocipedes and constitutes a division of my application filed September 20, 1937, bearing Serial No. 164,805 which is a continuation-in-part of my application filed March 22, 1937, bearing Serial No. 132,415.

One of the essential objects of the invention is to provide a handle bar structure of the type specified wherein the crossbar thereof is flexible so that it will cushion the hands and arms of the rider from shocks and jars.

Another object is to provide a handle bar structure which dispenses entirely with unsightly connections between the crossbar and its supporting means.

Another object is to provide a handle bar structure that is strong and durable, simple in construction and economical to manufacture.

Other objects, advantages and novel details of construction of this invention will be made more apparent as this description proceeds, especially when considered in connection with the accompanying drawing, wherein.

Figure 1:
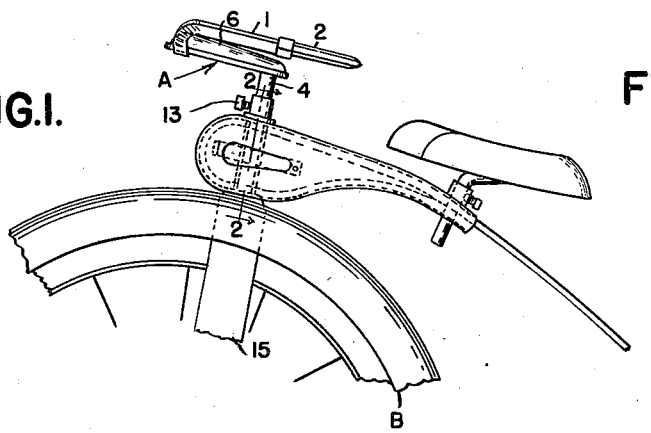
Figure 1 is a fragmentary side elevation of a velocipede having a handle bar structure embodying my invention.
Figure 2:
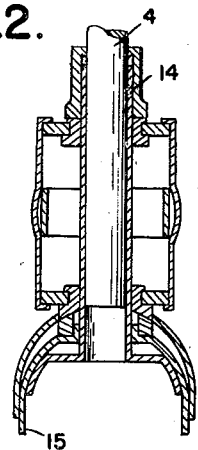
Figure 2 is a sectional view taken substantially on the line 2—2 of Figure 1.
Figure 3:
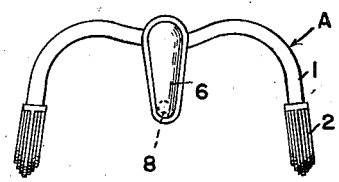
Figure 3 is a top plan view of the handle bar.
Figure 4:
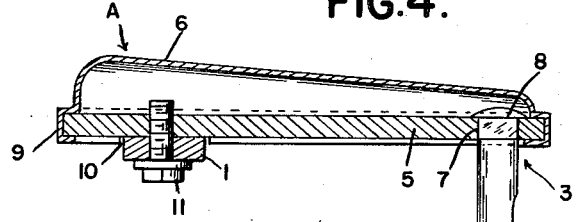
Figure 4 is a vertical sectional view through the handle bar.
Figure 6:
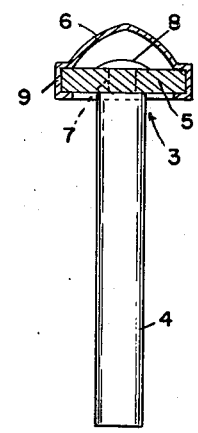
Figure 6 is a sectional view taken substantially on the line 6—6 of Figure 4.
Figure 5:
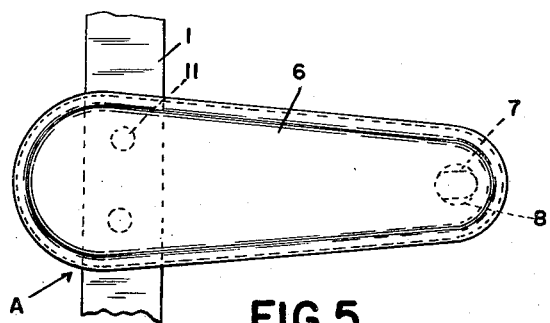
Figure 5 is a fragmentary top plan view of the structure illustrated in Figure 4.

Referring now to the drawing, A is a handle bar structure embodying my invention, and B is a velocipede to which this handle bar structure is applied. Preferably the handle bar structure consists of a crossbar or steering arm 1, hand grips 2, and a supporting member 3. As shown, the steering arm 1 comprises a single strip of spring steel and is substantially U-shape in plan. The grips 2 comprise elongated molded bodies of rubber or rubber composition and are sleeved upon the ends of said strip 1. If desired, these grips 2 may be formed from other suitable plastic materials and may obviously have any suitable exterior configuration or contour. The supporting member 3 comprises a post 4, elongated bar 5 and sheet metal sheathing 6. As shown, the upper end of the post 4 extends through an opening 7 in the bar 5 and is preferably riveted thereto as at 8. Preferably the bar 5 is formed from heavy gage sheet stock. The sheathing 6 extends over the bar 5 and is provided at the edges thereof in front and in rear of the crossbar 1 with channel-shaped portions 9 that embrace the edges of the bar 5. In the present instance the channel-shaped portions 9 are cut away as at 10 to receive the crossbar 1, and the latter is secured by suitable screws 11 to the underside of the elongated bar 5. Thus, with this construction the bar 5 and sheathing 6 form a hollow elongated arm wherein the rivet joint 8 between the post 4 and bar 5 is entirely concealed. Moreover, the connection between the crossbar 1 and the arm 5 is not conspicuous.

As usual the post 4 is received within and secured by a suitable set screw 13 to the tubular shank 14 of the front fork 15 of the velocipede.

From the foregoing it will be apparent that the spring crossbar 1 of the handle bar will provide the desired cushioning effect for the hands and arms of the rider. At the same time this spring steel crossbar will cooperate with the supporting member 3 to provide a very sturdy construction.

What I claim as my invention is:

1. In a handle bar structure, a crossbar provided with hand grips, and a built-up support for said crossbar comprising a post, and a hollow arm rigid with and projecting at substantially right angles from said post, the bottom of said arm being formed from heavy gage sheet stock and being rigid with said crossbar, and the top and sides of said arm being formed from relatively light gage sheet stock.

2. In a handle bar structure, a crossbar provided with hand grips, and a built-up support for said crossbar comprising a post, a pressed metal arm rigid with and projecting at substantially right angles from said post, said arm overlapping and being rigidly secured to said crossbar, and a sheathing for said arm concealing the joint between said arm and post and recessed to receive said crossbar.

3. In a handle bar structure, a crossbar provided at opposite ends thereof with grips, and supporting means for said crossbar including a post attachable to a shank of a steering fork, a bar rigid with said post at the upper end thereof, and a sheathing for said bar concealing the joint between the latter and said post.

4. In a handle bar structure, a crossbar provided with hand grips, and supporting means for said crossbar including a post attachable to the front fork of a velocipede, an elongated bar mounted on said post and projecting at substantially right angles therefrom, and a cover for said elongated bar embracing the edges thereof in front and in rear of said crossbar and concealing the joint between said elongated bar and post.

5. In a handle bar structure, a crossbar provided with hand grips, and a built-up support for said crossbar comprising a post, an arm rigidly connected at one end to said post and rigidly connected at its other end to said crossbar, and a sheet metal sheathing for said arm overlying the connections aforesaid and recessed to receive said crossbar.

6. In a handle bar structure, a crossbar provided with hand grips, and a built-up support for said crossbar comprising a post, and a two-part tubular arm extending at right angles to said post and to said crossbar, one part of said two-part arm being rigidly connected at spaced points longitudinally thereof to said post and to said crossbar, and the other part of said arm being recessed to receive said crossbar.

7. In a handle bar structure, a crossbar provided with hand grips, and a built-up support for said crossbar comprising a post, and a two-part tubular arm extending at right angles to said post and to said crossbar, one part of said two-part arm being rigidly connected at spaced points longitudinally thereof to said post and to said crossbar, the other part of said arm forming a covering for the first mentioned part and overlying the connections aforesaid with said post and crossbar.

8. In a handle bar structure, a crossbar provided with hand grips, and a built-up support for said crossbar including an inverted substantially L-shaped structure, the upright arm of the L being attachable to a front fork of a velocipede, the horizontal arm of the L being hollow and disposed at substantially right angles to the crossbar, the bottom of said hollow arm being a relatively thick elongated bar and being rigidly connected to said crossbar, the top and sides of said arm being formed from relatively light gage sheet stock and overlying the connection aforesaid with said crossbar.

9. In a handle bar structure, a crossbar provided with hand grips, and a built-up support for said crossbar including a hollow arm disposed at substantially right angles to said crossbar, the bottom of said arm being formed from relatively heavy gage sheet stock and being rigidly connected to said crossbar, and the top and sides of said arm being formed from relatively light gage sheet stock and overlying the connection aforesaid with said crossbar.

SAMUEL A. SNELL.